Figure 1:
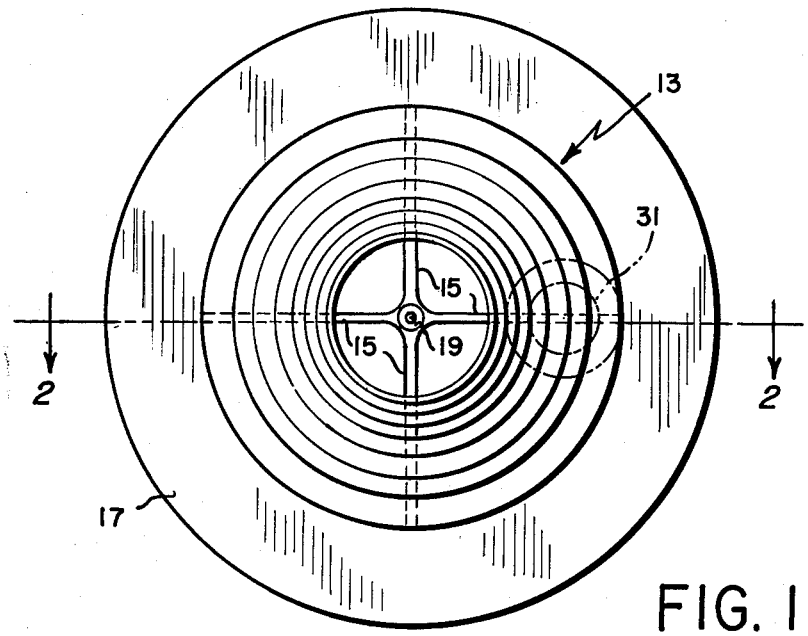

Sept. 26, 1961 J. A. URBAN ET AL 3,001,452
ROTARY EXHAUST DEFLECTOR
Filed Jan. 28, 1959 2 Sheets-Sheet 1

INVENTORS.
JOHN A. URBAN &
RICHARD C. RANDALL
BY
ATTORNEYS

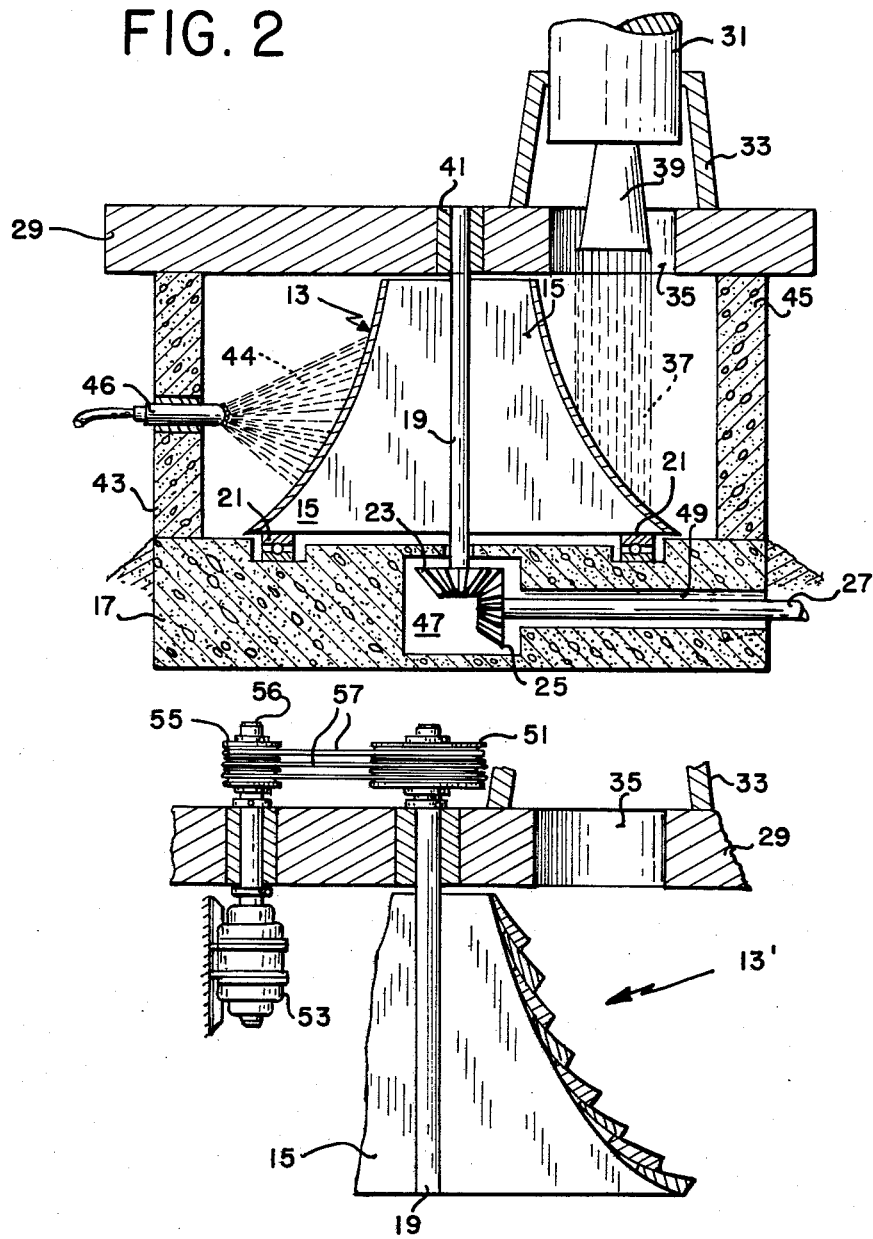

United States Patent Office 3,001,452
Patented Sept. 26, 1961

3,001,452
ROTARY EXHAUST DEFLECTOR
John A. Urban, San Pedro, and Richard C. Randall, Torrance, Calif., assignors to the United States of America as represented by the Secretary of the Air Force
Filed Jan. 28, 1959, Ser. No. 789,757
3 Claims. (Cl. 89—1.7)
(Granted under Title 35, U.S. Code (1952), sec. 266)

The invention described herein may be manufactured and used by or for the United States Government for governmental purposes without payment to us of any royalty thereon.

This invention relates to a flame deflector for use with rocket engines during static testings and run-ins prior to launching. More particularly, the invention is concerned with providing a surface from which the exhaust blast of a rocket engine may be deflected without causing hot-spots or requiring large amounts of cooling water to prevent destruction of the surface by violent erosion.

During engine testing and prior to launching, some structure must be employed to support the rocket engined aircraft in the proper attitude. Such a device is commonly known as a "launcher." Basically, it is a mechanical structure which supports and constrains the rocket so that it leaves the ground in the proper direction and follows the initial flight pattern. Of all the various types of launchers used, the platform and tower launchers are most commonly used for large, high-altitude research rockets and spacecraft. To prevent violent erosion of the area beneath the launcher by the concentrated exhaust stream, a pyramid shaped blast deflector plate is commonly placed at the base of the platform. Large amounts of water are poured over and around the deflector during the time that the rocket engine is operating in order to prevent destruction of the deflector plate and consequent erosion of the surrounding area. The present invention eliminates the necessity of having large quantities of water available at launching sites, and piping and plumbing which accompany the transfer of water from its source to the deflection plate.

Accordingly, an important object of the present invention is to provide an improved means for deflecting the blast from the exhaust nozzle of a rocket engine by including a movable surface upon which the exhaust flame impinges.

Another object of the invention is to provide a rocket engine exhaust deflector which is constructed from a series of concentric annular members each of which is independently replaceable if necessary.

Still another object of the invention is to provide an exhaust deflector which is rotatable and offers a greater surface area from which the intense heat generated by the rocket engine may be dissipated.

A still further object of the invention is to provide an exhaust deflector which eliminates the necessity of providing unusually large amounts of water to deluge the deflector. A relatively small amount of water may be helpful for quenching the deflector described herein at some point of its rotation during prolonged runs of 20 to 25 seconds.

Figure 3:
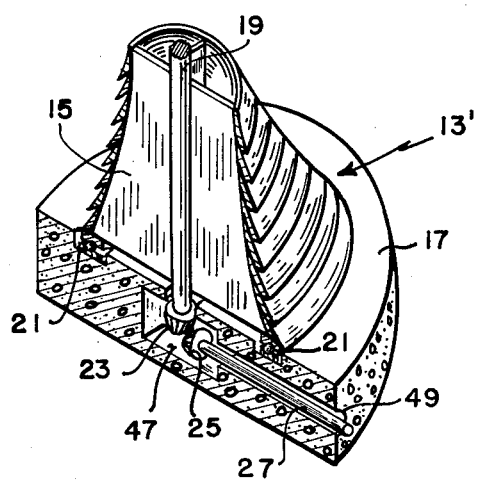

These and other objects, features and advantages, including safety features and construction benefits, will become more apparent when considered in connection with the following drawings showing typical preferred embodiments wherein:

FIG. 1 is a plan view of the rotary deflector including a representation of the rocket exhaust section;
FIG. 2 is a sectional view along the line 2—2 of FIG. 1;
FIG. 3 is a view in perspective of a modified deflector cone and the base upon which it is mounted; and
FIG. 4 is a cross-sectional view of a portion of the deflector in FIG. 3 showing the interlocking rings from which the deflector is constructed and a belt and pulley drive arrangement.

Referring now to FIG. 1, there is shown a view looking down at the top of the deflector 13. The main portion of the deflector 13 may comprise a series of concentric rings which when assembled take the form of a truncated, concave surfaced, right circular cone. A series of support members 15 are inserted inside the cone shaped deflector and serve to support and form the rings into the desired concave configuration. The deflector cone would normally be mounted on a fixed concrete base 17. When operating as a blast deflector the member 13 would pivot about the pivot shaft 19.

A cross-sectional view along the line 2—2 is shown in FIG. 2. It will be noted that the deflector is mounted to rotate on a bearing ring 21. The shaft 19 has attached to its lower end the bevel gear 23 which engages with a corresponding bevel gear 25. The gear 25 is attached to the shaft 27 which is connected to a constant drive motor (not shown). A support structure including a platform 29 is used for the purpose of supporting the missile 31 on a missile stand or launcher 33. An opening 35 is provided in the platform 29 through which the exhaust blast 37 from the nozzle 39 passes and impinges on the deflector 13.

A bushing or bearing 41 is disposed in the center of the platform 29 and serves as a support means for the upper end of the shaft 19. The platform 29 would, of course, be fixed and may be supported by the uprights 43 and 45.

Under conditions where additional cooling is required, a small stream of water 44 may be sprayed from the nozzle 46 to add to the cooling of the deflector.

The concrete base portion 17 would have the opening 47 provided therein to serve as a housing for the gears 23 and 25. An elongated opening 49 is also provided to act as a passage for the drive shaft 27 to be connected to its drive motor.

In FIG. 3 there is shown a sectional view of the blast deflector in perspective. As shown in this view, the main blast receiving conical portion is made up of a series of concentric rings. This arrangement is more clearly shown in FIG. 4. It can be easily seen that if one or more of the rings needs replacement, it is a relatively simple operation to restore the deflector to its original condition by substituting the burnt rings with other new or reconditioned rings.

It may be desirable under certain circumstances to drive the central shaft 19 by a system other than that shown in FIG. 2. The alternate drive, as shown in FIG. 4, includes a pulley 51 attached to the upper end of the central shaft 19. A constant drive motor 53 having the pulley 55 attached to its shaft 56 is mounted under the platform 29. The pulleys 51 and 53 are connected to each other by the belts 57. The motor serves as the drive means to rotate the deflector member 13' during the critical run-in or testing periods.

It has been determined that the critical time period when operating on the presently known dry deflectors is encountered within 2–4 seconds after the start of the blast period. Using the rotary deflector described herein prolonged runs lasting 5 to 10 times longer may be accomplished without the danger of hot-spots and burn-out.

In the most useful application of the rocket blast deflector shown in the drawings and described in the foregoing matter, the rocket is of the type which is normally launched from a platform or tower launcher so that it would point substantially vertically upward. This would mean that the blast would extend in a directly opposite direction or downward. The problem, of course, is to deflect the blast so that the intense heat will not destroy the area in the path of the rocket blast. In doing so, something must be put in this path and the present invention provides that a rotating conical member be placed in such a position that the blast from the rocket impinge on the moving member rather than on a fixed stationary surface. This prevents the violent erosion that would result from normal blast discharge of the rocket.

As the deflector 13 driven by the gear 23 attached to the shaft 19 rotates, the blast 37 from the missile 31 impinges thereon. However, the rotation of the deflector 13 eliminates the formation of hot-spots and consequent necessity of large quantities of deluge water. Also, constant rotation at optimum speeds allows for a certain amount of air cooling of the deflector, and if additional cooling is required this can be done by quenching the deflector at some point of its rotation with a relatively minor amount of water.

Having described only typical embodiments of the invention, it will be understood by those skilled in the art that various changes and modifications may be made therein without departing from the true spirit and scope of the invention.

What we claim is:

1. An exhaust deflector for deflecting the blast issuing from the exhaust nozzle of a rocket comprising, a base portion, a plurality of upright members supported by said base portion and extending upwardly therefrom, a platform having at least one opening therein held in spaced relation to said base portion by said upright members, a rocket disposed over the opening in said platform so that its exhaust blast issues through said opening, a truncated concave surfaced rotatable right circular conical deflector member disposed between said base and said platform, said deflector member being laterally displaced such that the blast issuing from said rocket and passing through said opening impinges on a limited area of the conical surface of said deflector member, a rotatable shaft, said deflector member being mounted on said shaft for rotation therewith, and means for rotating said rotatable shaft.

2. The exhaust deflector defined in claim 1 including auxiliary quenching means comprising a nozzle for dispensing fluid, said nozzle being constructed and arranged to direct a stream of fluid over a limited area of the outer surface of the rotating conical deflector member, the limited fluid receiving area being already exposed to and heated by the exhaust blast of the rocket.

3. An exhaust deflector for deflecting the blast issuing from the exhaust nozzle of a rocket comprising a base portion, a plurality of upright members supported by said base portion and extending upwardly therefrom, a platform having at least one opening therein held in spaced relation to said base portion by said upright members, a rocket disposed over the opening in said platform so that its exhaust blast issues through said opening, a truncated right circular conical deflector member rotatably disposed between said base and said platform, said deflector member comprising a plurality of individually replaceable concentric annular members of progressively varying diametrical dimensions and a series of shaped support members serving as inner ribs to hold said annular members in place to form the conical deflector member, the blast issuing from said rocket and passing through said opening impinging on the outer surface of said annular members forming the deflector member, a rotatable shaft, said deflector member being mounted on said shaft for rotation therewith, and means for rotating said rotatable shaft.

References Cited in the file of this patent

UNITED STATES PATENTS

| | | |
|---|---|---|
| 1,741,726 | Murray | Dec. 31, 1929 |
| 2,374,608 | McCollum | Apr. 24, 1945 |
| 2,382,386 | Arms | Aug. 14, 1945 |
| 2,498,995 | Manning | Feb. 28, 1950 |
| 2,692,024 | Burdett et al. | Oct. 19, 1954 |
| 2,826,382 | Hayden | Mar. 11, 1958 |
| 2,925,013 | Santora et al. | Feb. 16, 1960 |